United States Patent
Bixenman et al.

(12) 
(10) Patent No.: US 6,446,729 B1
(45) Date of Patent: Sep. 10, 2002

(54) SAND CONTROL METHOD AND APPARATUS

(75) Inventors: Patrick W. Bixenman, Houston; Eduardo H. Albino, Sugar Land, both of TX (US)

(73) Assignee: Schlumberger Technology Corporation, Sugarland, TX (US)

(*) Notice: Subject to any disclaimer, the term of this patent is extended or adjusted under 35 U.S.C. 154(b) by 0 days.

(21) Appl. No.: 09/732,134

(22) Filed: Dec. 7, 2000

Related U.S. Application Data

(63) Continuation-in-part of application No. 09/419,585, filed on Oct. 18, 1999, now Pat. No. 6,343,651.
(60) Provisional application No. 60/170,071, filed on Dec. 10, 1999, and provisional application No. 60/195,367, filed on Apr. 6, 2000.

(51) Int. Cl.$^7$ .............................................. G21B 43/08
(52) U.S. Cl. ..................... 166/386; 166/51; 166/205; 166/227; 166/278; 166/387
(58) Field of Search .................. 166/51, 205, 227, 166/276, 278, 332.1, 332.4, 334.4, 373, 386, 387

(56) References Cited

U.S. PATENT DOCUMENTS

| | | |
|---|---|---|
| 3,692,114 A | 9/1972 | Murphey, Jr. et al. |
| 3,913,676 A | 10/1975 | Barbee, Jr. et al. |
| 3,926,409 A | 12/1975 | Abney et al. |
| 3,963,076 A | 6/1976 | Winslow |
| 4,253,522 A | 3/1981 | Setterberg |
| 4,401,158 A | 8/1983 | Spencer et al. |
| 4,541,486 A | 9/1985 | Wetzel et al. |
| 4,566,538 A | 1/1986 | Peterson |
| 4,606,408 A | 8/1986 | Zunkel et al. ......................... |

(List continued on next page.)

OTHER PUBLICATIONS

Gravel Pack Systems: Mini–Beta Gravel Pack System, Baker Oil Tools, pp. 12–13, (Undated).

Sides, Win, Hydraulic Intelligent Completions, Baker Hughes, Advanced Technology Conference, Sep. 30–Oct. 1, 1999, slides 1–28.

STDZ and Multizone Completion Systems, Halliburton Company, 1995.

*Primary Examiner*—Thomas B. Will
*Assistant Examiner*—Zakiya Walker
(74) *Attorney, Agent, or Firm*—Trop, Pruner & Hu P.C.

(57) ABSTRACT

A well completion is provided to enable sand-control treatment of one or more production zones with only a single trip into a well. In one example arrangement, the completion may include a first, second and third packer. The first packer may be attached to a production tubing. A first sand screen may be disposed between the first and second packers. A first closing sleeve may be disposed between the first packer and the first sand screen. A first surface controlled flow control device may be disposed between the first sand screen and the second packer. A control conduit extending from the earth's surface is sealably passed through the first packer and connected to the first surface controlled flow control device. A second sand screen is disposed between the second and third packers. A second closing sleeve may be disposed between the second packer and the second sand screen. A second surface controlled flow control device may be connected to the control conduit and disposed between the second sand screen and the third packer. The first sand screen may be disposed within the well proximate a first production zone and the second sand screen may be disposed within the well proximate a second production zone. A service tool is deployed through the production tubing to manipulate the first and second closing sleeves and to effectuate necessary sand-control pumping operations. Signals may be sent via the control conduit to open and close the first and second surface controlled flow control devices.

58 Claims, 15 Drawing Sheets

U.S. PATENT DOCUMENTS

| | | | |
|---|---|---|---|
| 4,858,690 A | 8/1989 | Rebardi et al. |
| 5,033,549 A | 7/1991 | Champeaux et al. |
| 5,115,860 A | 5/1992 | Champeaux et al. |
| 5,156,220 A | 10/1992 | Forehand et al. |
| 5,174,379 A | 12/1992 | Whitely et al. |
| 5,211,241 A | 5/1993 | Mashaw, Jr. et al. |
| 5,219,025 A | 6/1993 | Berger et al. |
| 5,287,930 A | 2/1994 | McGill |
| 5,311,936 A | 5/1994 | McNair et al. |
| 5,318,121 A | 6/1994 | Brockman et al. |
| 5,332,038 A | 7/1994 | Tapp et al. |
| 5,337,808 A | 8/1994 | Graham |
| 5,343,953 A | 9/1994 | Patel |
| RE34,758 E | 10/1994 | Farley et al. |
| 5,355,953 A | 10/1994 | Shy et al. |
| 5,370,180 A | 12/1994 | Barbee |
| 5,377,749 A | 1/1995 | Barbee |
| 5,377,750 A | 1/1995 | Arterbury et al. |
| 5,443,117 A | 8/1995 | Ross |
| 5,579,844 A | 12/1996 | Rebardi et al. |
| 5,609,204 A | 3/1997 | Rebardi et al. |
| 5,620,050 A | 4/1997 | Barbee |
| 5,641,023 A | 6/1997 | Ross et al. |
| 5,746,274 A | 5/1998 | Voll et al. |
| 5,842,516 A | 12/1998 | Jones |
| 5,865,251 A | 2/1999 | Rebardi et al. |
| 5,875,852 A | 3/1999 | Floyd et al. |
| 5,896,928 A | 4/1999 | Coon |
| 5,931,229 A | 8/1999 | Lehr et al. |
| 5,941,307 A | 8/1999 | Tubel |
| 5,975,205 A | 11/1999 | Carisella |
| 6,216,785 B1 * | 4/2001 | Achee, Jr. et al. ......... 166/278 |

* cited by examiner

SAND CONTROL METHOD AND APPARATUS

CROSS-REFERENCE TO RELATED APPLICATIONS

This application claims the benefit of U.S. Provisional Application No. 60/170,071, filed Dec. 10, 1999; and of U.S. Provisional Application No. 60/195,367, filed Apr. 6, 2000. This is a continuation-in-part of U.S. Ser. No. 09/419,585, filed Oct. 18, 1999, now U.S. Pat. No. 6,343,651

TECHNICAL FIELD

The present invention relates to subsurface well equipment and, more particularly, to a sand control method and apparatus.

BACKGROUND

It is well known to those engaged in the exploration of oil and gas that certain subterranean hydrocarbon-producing formations have sand commingled with the hydrocarbons. For various reasons, which are well-known in the art, it is not desirable to produce the commingled sand to the earth's surface along with the hydrocarbons. As such, the industry developed sand-control completions that, in broad terms, include an upper and an optional lower, or sump, packer with various mechanisms disposed therebetween, including a closing sleeve and a sand screen. The upper packer, such as a seal bore retrievable packer, is initially connected to a service string, and the entire sand-control completion is lowered into the well on the service string until the sand screen is positioned adjacent the hydrocarbon-producing formation. If the well is cased, then the sand screen will be positioned adjacent perforations in the casing. A service tool in the service string is used to perform various functions and operations with regard to the sand-control completion, including washing down the well bore as the string is run into the well bore, setting the packers, displacing fluids in the annulus above the upper packer, squeezing fluids into the production annulus and into the formation (e.g., through the casing perforations), packing gravel into the annulus between the sand screen and the formation, circulating fluids into the production annulus, and reverse-circulating fluids out of the service tool and service string. After all necessary operations have been carried out, and the sand-control completion is ready to produce the hydrocarbons to the earth's surface, the service string and tool are disconnected from the upper packer and removed from the well. A production tubing is then lowered into the well and connected to the upper packer, at which time production operations may commence. All of these functions and operations are known to those skilled in the art of sand-control and gravel pack completions.

It is also well known that it is not uncommon for a single well to have multiple producing zones, such as an upper zone and a lower zone. In this situation, the lower zone is typically completed in the manner discussed in the preceding paragraph. Next, instead of stabbing a production tubing into the upper seal bore packer (i.e., the one above the lower zone), the service string is used to run a second sand-control completion into the well and stabbed into the upper packer. This second sand-control completion is then used to complete the upper zone in the same manner as discussed above. It is desirable in some instances, however, to complete the multiple zones with a single run of the completion equipment.

SUMMARY

In general, according to one embodiment, a string comprises a tubing, a sealing element coupled to the tubing, a sand control device positioned downstream of the sealing element, and a tool adapted to be run through the tubing to perform at least one of a gravel pack operation, a fracturing operation, a cleaning operation, and a stimulating operation.

Other features and embodiments will become apparent from the following description, from the drawings, and from the claims.

DETAILED DESCRIPTION

Figure 1A:
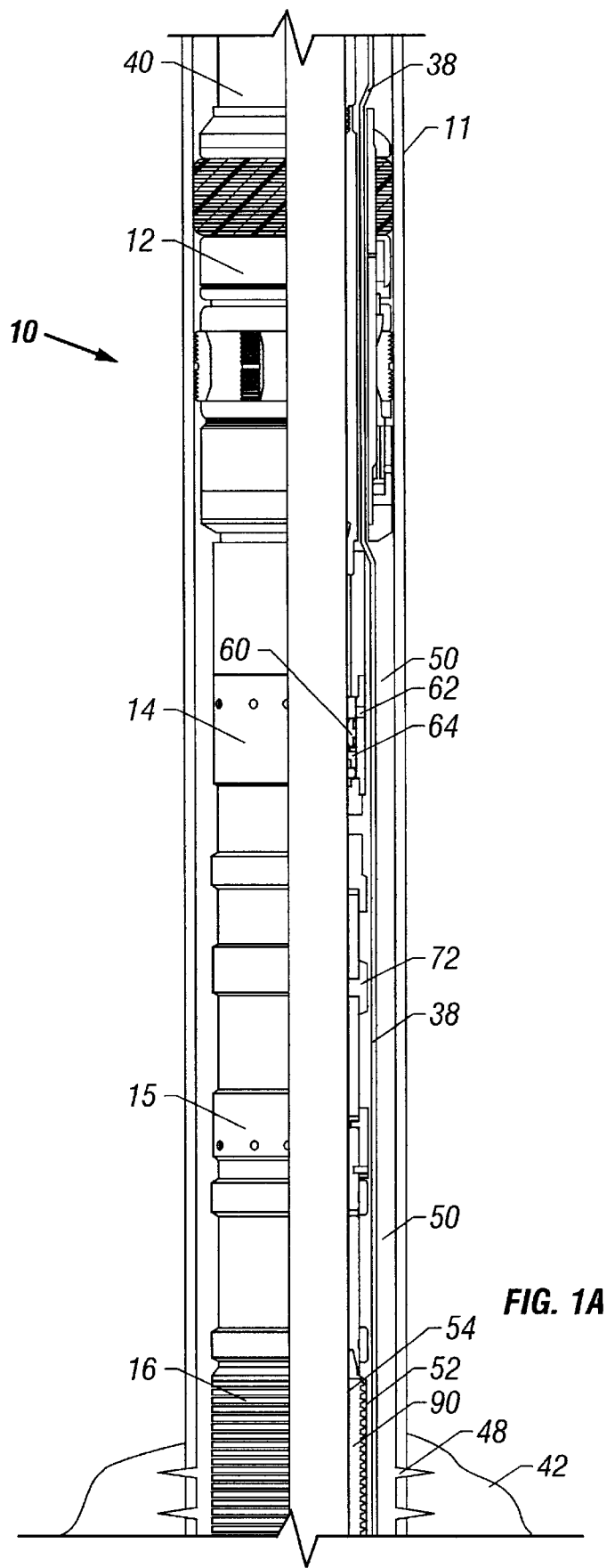
FIGS. 1A–1D illustrate a longitudinal view in partial cross-section of one embodiment of the well completion of the present invention.

In the following description, numerous details are set forth to provide an understanding of the present invention. However, it will be understood by those skilled in the art that the present invention may be practiced without these details and that numerous variations or modifications from the described embodiments may be possible.

As used here, the terms "up" and "down"; "upper" and "lower"; "upwardly" and downwardly"; "upstream" and "downstream"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

Referring to the drawings in detail, wherein like numerals denote identical elements throughout the several views, one embodiment of the multi-zone sand-control completion 10 of the present invention is shown in FIGS. 1A–1D disposed in a casing 11. The completion 10 may include a first packer 12, a first gravel-pack extension with closing sleeve 14 below the first packer 12, a first upper safety shear sub 15 below the first closing sleeve 14, a first sand screen 16 below the first upper safety shear sub 15, a first surface controlled flow control device 18 below the first sand screen 16, a first lower safety shear sub 19 below the first surface controlled flow control device 18, a second packer 20 below the first lower safety shear sub 19, a second gravel-pack extension with closing sleeve 22 below the second packer 20, a second upper safety shear sub 23 below the second closing sleeve 22, a second sand screen 24 below the second upper safety shear sub 23, a second surface controlled flow control device 26 below the second sand screen 24, a second lower safety shear sub 27 below the second surface controlled flow control device 26, a third packer 28 below the second lower safety shear sub 27, a third gravel-pack extension with closing sleeve 30 below the third packer 28, a third safety shear sub 31 below the third closing sleeve 30, a third sand screen 32 below the third safety shear sub 31, a third surface controlled flow control device 34 below the third sand screen 32, and a fourth, or sump, packer 36 below the third surface controlled flow control device 34.

While one embodiment of the invention illustrated in FIGS. 1A–1D includes three sets of sand-control components for treating three production zones (i.e., 42–46), that should not be taken as a limitation. Instead, the present invention may be used with one or more sets of components. Also, although reference is made to closing sleeves 14, 22, 30, other types of fluid communication control devices may be employed in other embodiments. Such closing sleeves 14, 22, 30 or other fluid communication devices can be actuated between open and closed positions. In addition, some closing sleeves and fluid communication devices can also be set at one or more intermediate positions between the open and closed positions.

The completion 10 may further include a control conduit 38 running from the earth's surface (not shown) to the surface controlled flow control devices 18, 26 and 34 and/or to other "intelligent" devices. For purposes of this invention the term "intelligent device" includes any device used in "intelligent" or "smart" well completions, including but not limited to devices such as temperature sensors, pressure sensors, flow-control devices, flow rate measurement devices, oil/water/gas ratio measurement devices, scale detectors, and the like. Although reference is made to a surface controlled intelligent completion device, it is contemplated that, in other embodiments, control may be provided by a downhole control module (instead of a surface control module). Such a downhole control module may be part of an intelligent completion system.

In one embodiment, the control conduit 38 may include a plurality of cables, such as one or more electrical, fiber optic or hydraulic cables for transmitting data, signals, pressurized fluid, power, etc. between the earth's surface and any intelligent device, such as the surface controlled flow control devices 18, 26 and 34. The packers 12, 20, and 28 may be polished bore retrievable packers, and may be of the "multiport" type (i.e., one that allows for passage of a plurality of control lines therethrough), also known as a "control line bypass" packer, and be capable of sealably passing the control conduit 38 therethrough while at the same time maintaining pressure integrity. In another embodiment, instead of providing the completion 10 with a control conduit 38, the surface controlled flow control devices 18, 26, and 34 may be controlled from the earth's surface via pulse technology or other wireless mechanisms, such as by use of electromagnetic signals and the like.

As shown at the top of FIG. 1A, a production tubing 40 is attached to the first packer 12, and the entire completion 10 is run into the casing 11 in a single trip. In another embodiment, other components may be coupled between the tubing 40 and the first packer 12. For example, such components may include permanent monitoring devices, gas lift mandrels, safety valves, and so forth. As used here, the production tubing 40 is said to be coupled to the first packer 12 even if there are additional components between the production tubing 40 and the packer 12.

Figure 1B:
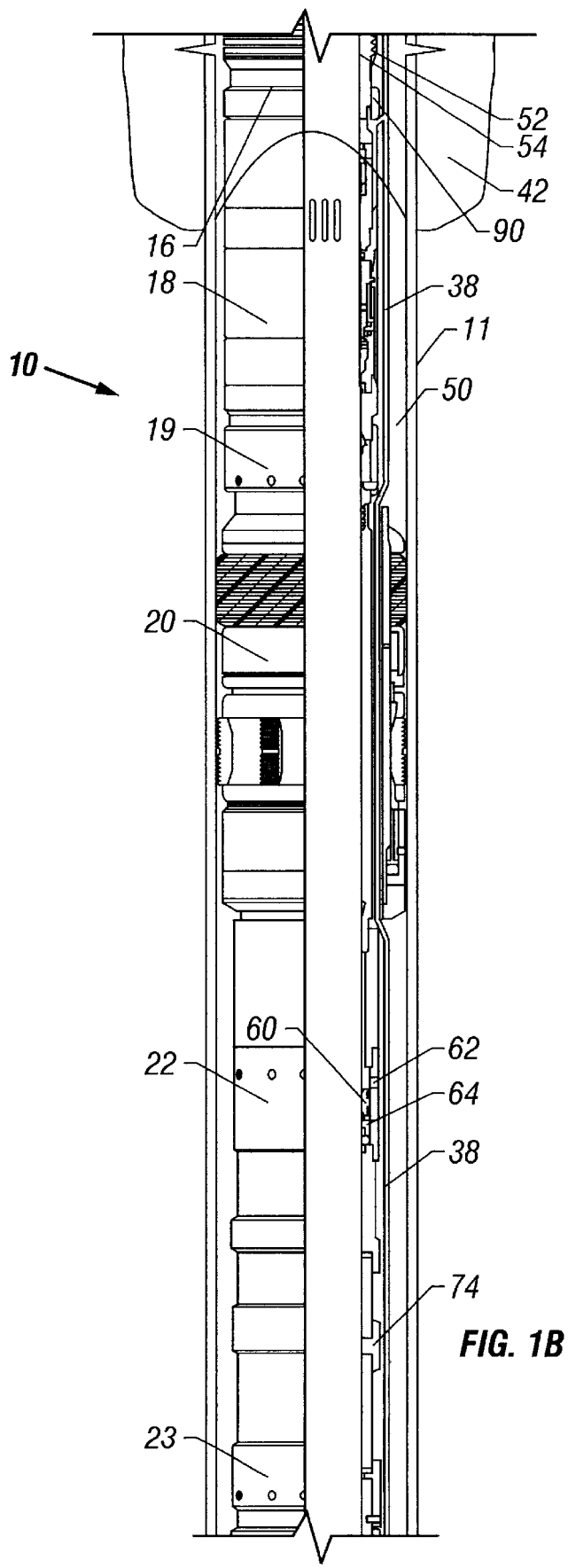
Figure 1C:
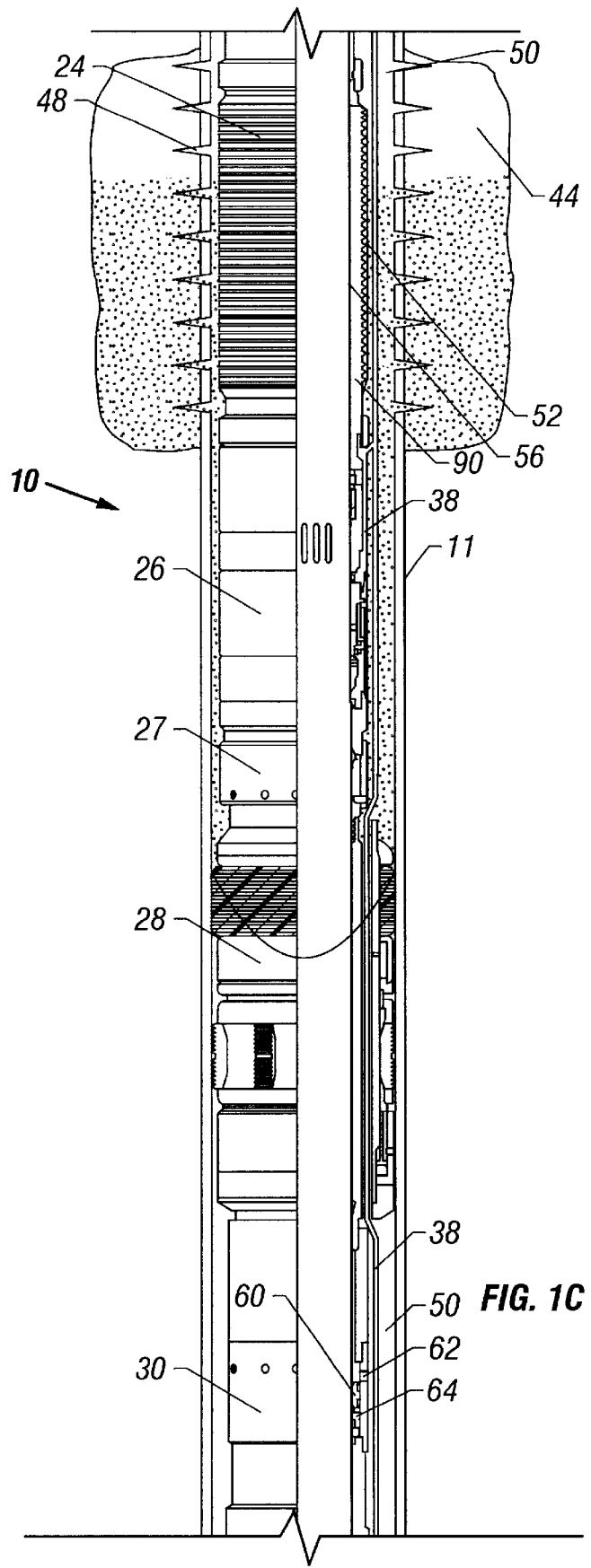
Figure 1D:
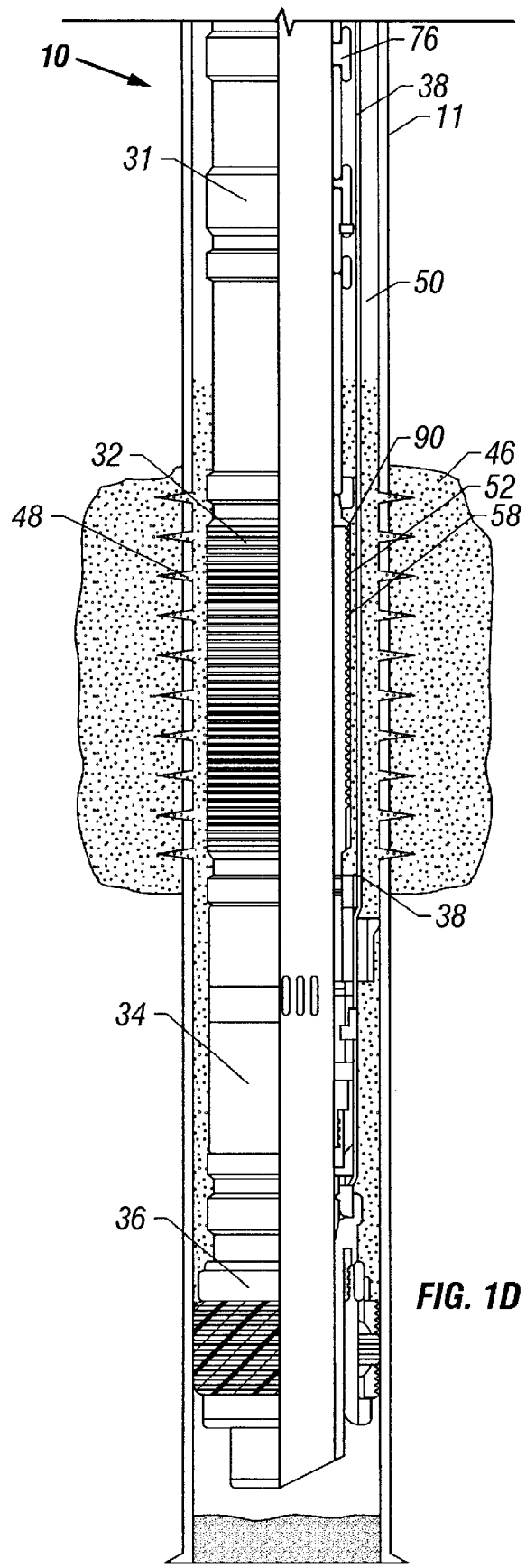

The completion 10 is lowered into the casing 11 until the first sand screen 16 is disposed adjacent a first production zone or formation 42 (see FIGS. 1A and 1B), in which position the second sand screen 24 will be disposed adjacent a second production zone or formation 44 (see FIG. 1C) and the third sand screen 32 will be disposed adjacent a third production zone or formation 46 (see FIG. 1D). The casing 11 is provided with perforations 48 through which desirable hydrocarbons, and undesirable sand, may flow from the production zones 42–46 into a well annulus 50. The sand screens 16, 24 and 32 are provided with numerous passageways 52 and internal sleeve members 54, 56 and 58, respectively, the function of which will be explained below. When the completion 10 is being run into the casing 11, the surface controlled flow control devices 18, 26 and 34 and the closing sleeves 14, 22 and 30 are closed to allow fluid circulation to the bottom of the completion 10. Once the completion 10 is properly positioned, the packers 12, 20, 28 and 36 can be set in any manner known in the art (e.g., pressuring up the production tubing 40, via the control line 38, or with a service tool (discussed below and illustrated in FIGS. 2A–2C).

Next, each of the production zones 42–46 are gravel packed, beginning with the third, or lower, production zone 46. To begin this process, the third closing sleeve 30 must first be opened (recall from above that all closing sleeves 14, 22 and 30 are closed when the completion 10 is being run into the casing 11, in one embodiment). To enable the closing sleeves 14, 22 and 30 to be remotely opened and closed, in an embodiment, each of them may be provided with a closure member 60, which may include an associated opening mechanism with latching profile 64. Each closure member 60 is adapted to be remotely shifted thereby opening and closing numerous flow ports 62 in the closing sleeves 14, 22 and 30. The completion 10 as shown in FIGS. 1A–1D is in the following configuration: the first closing sleeve 14 has its closure member 60 shifted to its closed position, so as to restrict flow through its flow ports 62 (see FIG. 1A); the second closing sleeve 22 has its closure member 60 shifted to its open position, so as to permit flow through its flow ports 62 (see FIG. 1B); and the third closing sleeve 30 has its closure member 60 shifted to its closed position, so as to restrict flow through its flow ports 62 (see FIG. 1C). The manner in which the closure members 60 are shifted between their opened and closed positions, and the manner in which the distinct production zones 42–46 are independently gravel packed, will now be explained with reference to FIGS. 2A–2C.

Figure 2A:
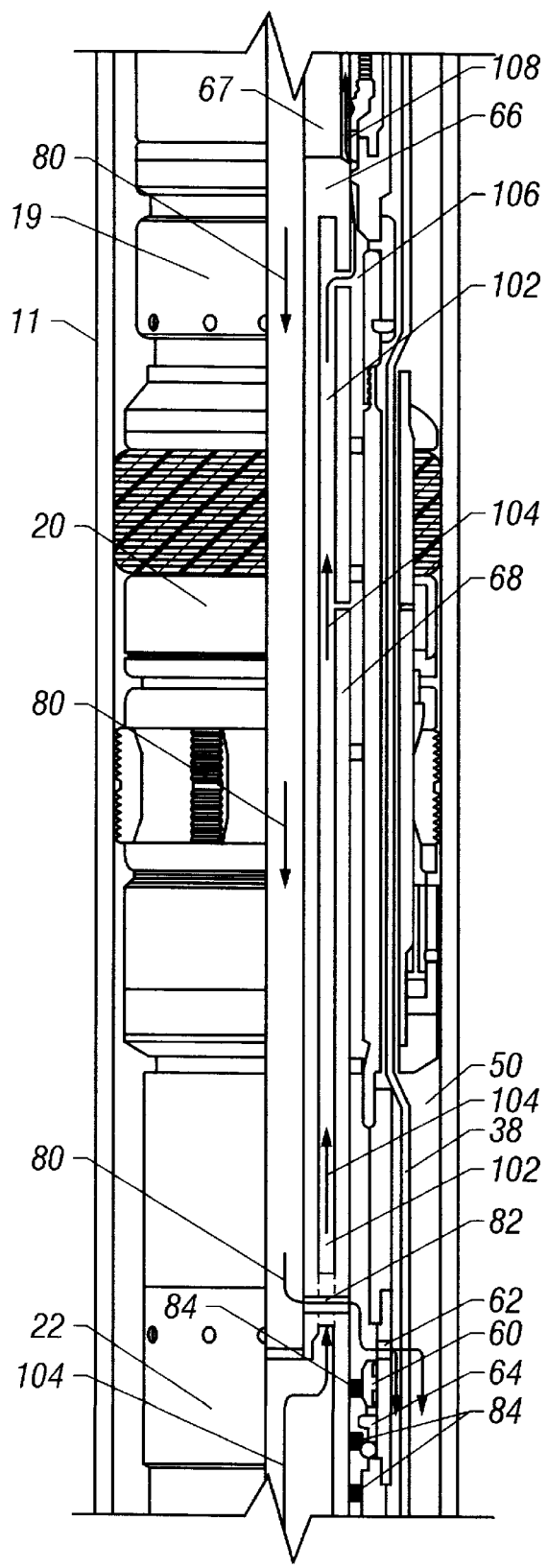
FIGS. 2A–2C illustrate an enlarged longitudinal view in partial cross-section of a portion of the well completion shown in FIGS. 1A–1D.
Figure 2B:
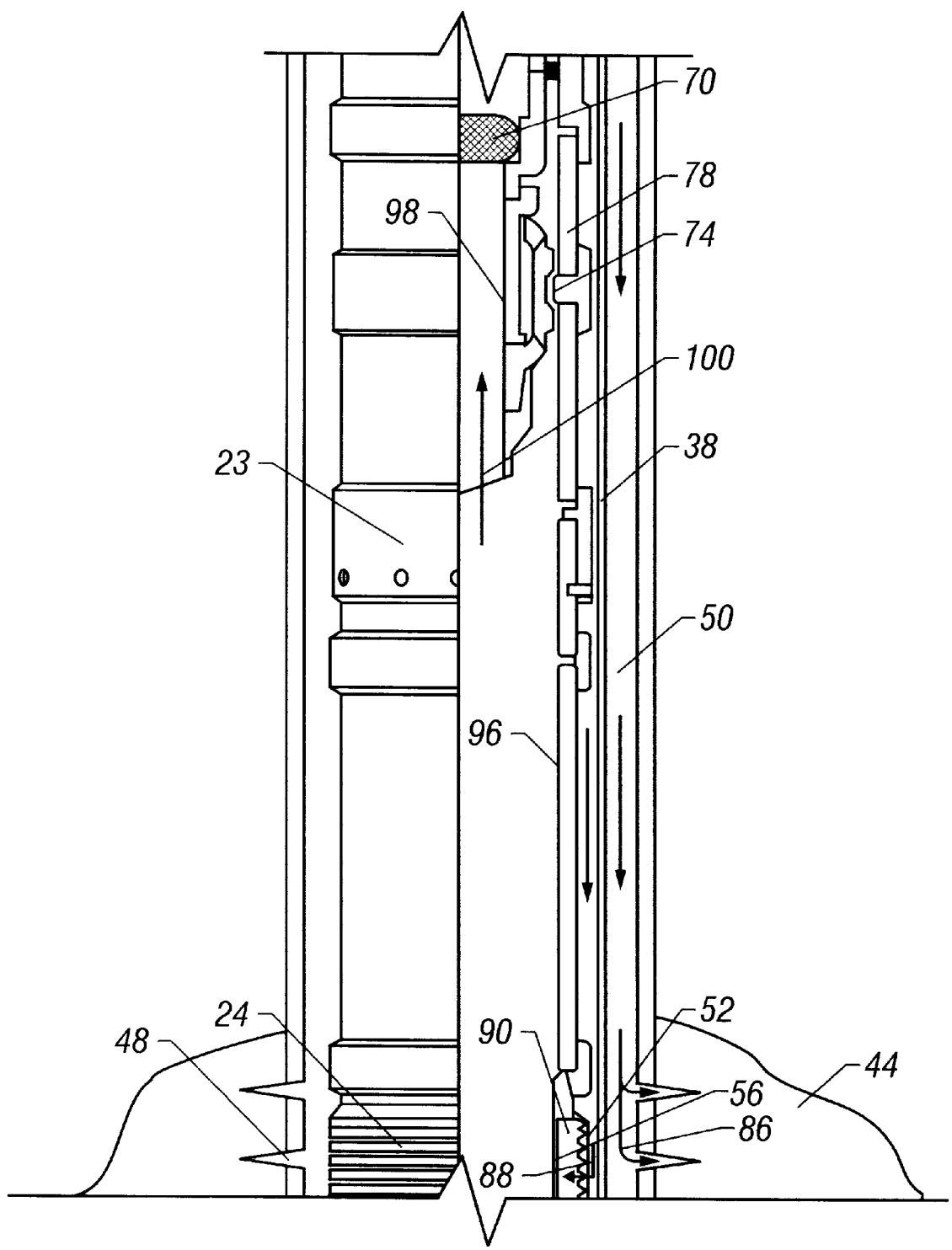
Figure 2C:
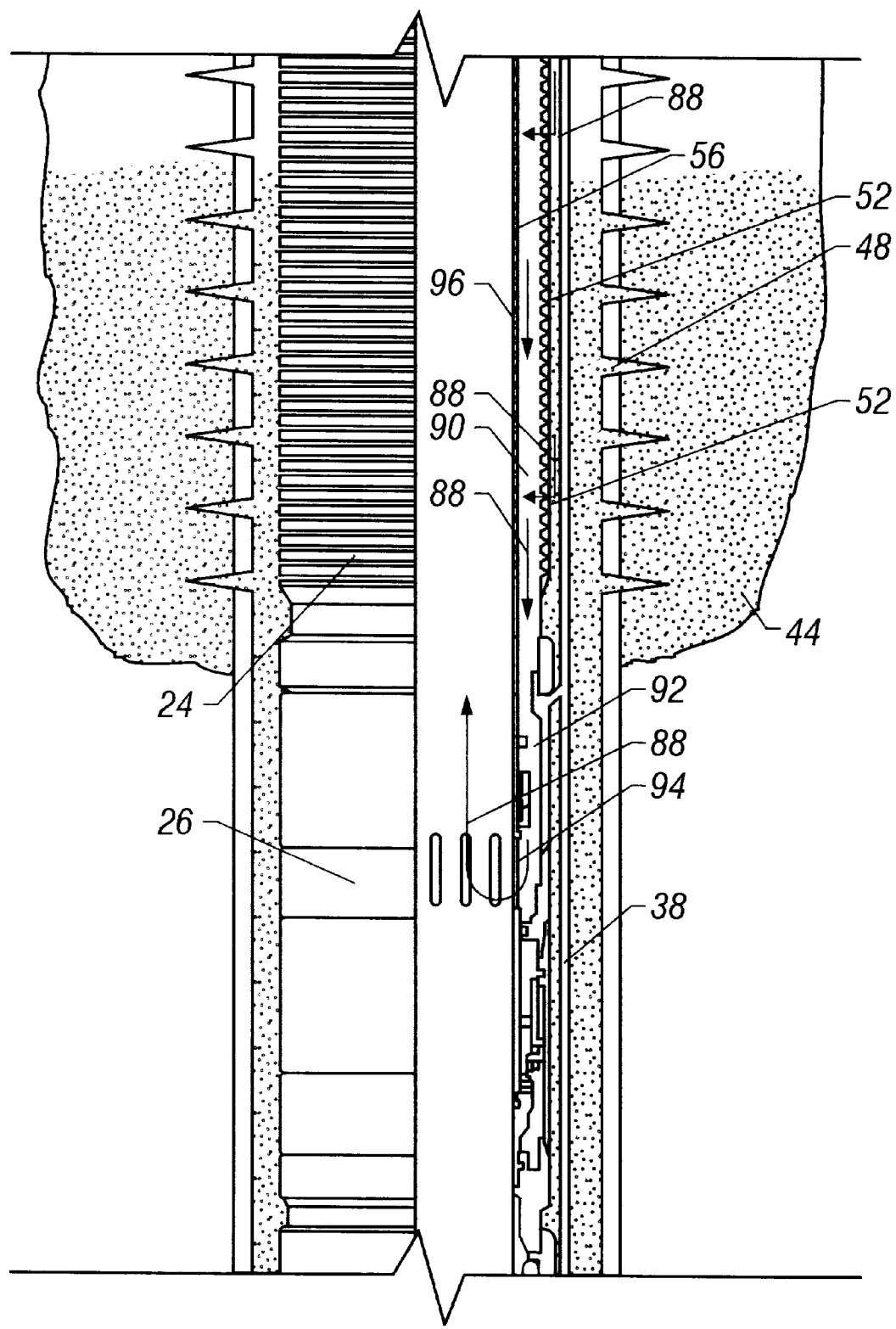
Figure 3A:
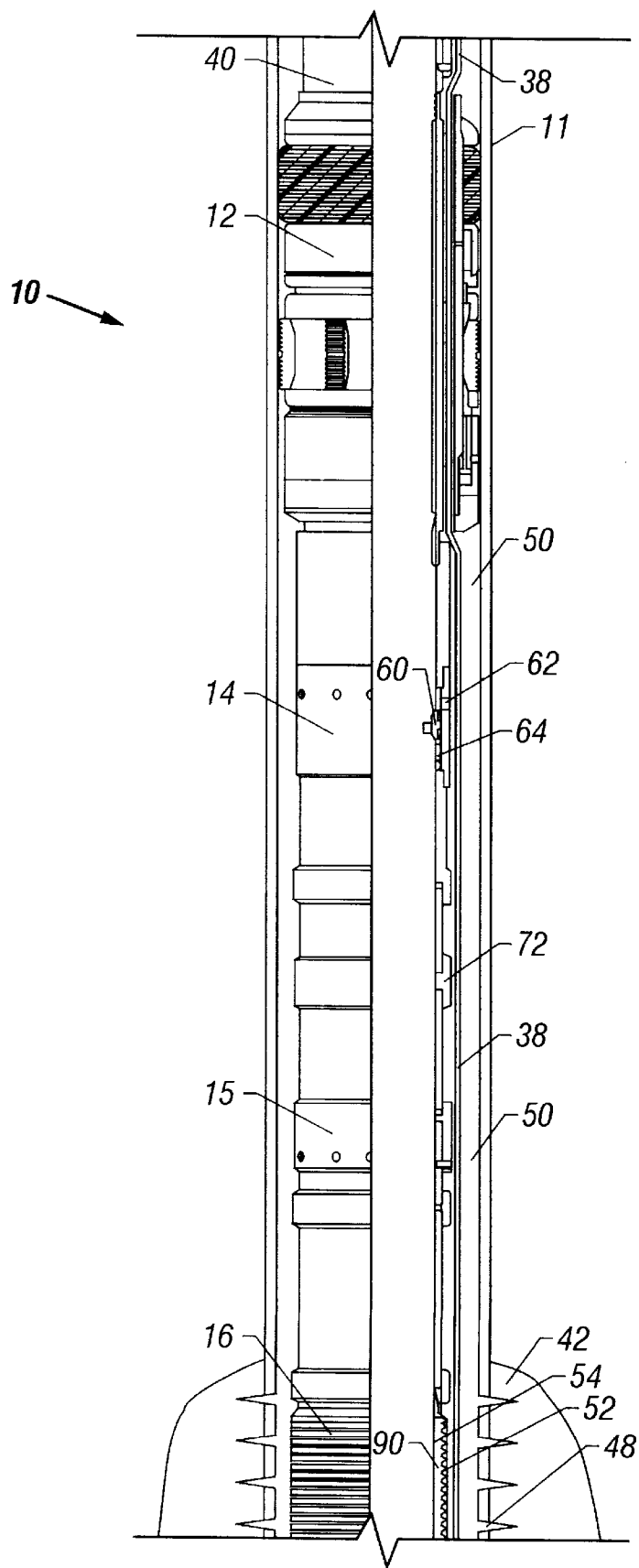
FIGS. 3A–3D illustrate a longitudinal view in partial cross-section of a second embodiment of the well completion of the present invention.
Figure 3B:
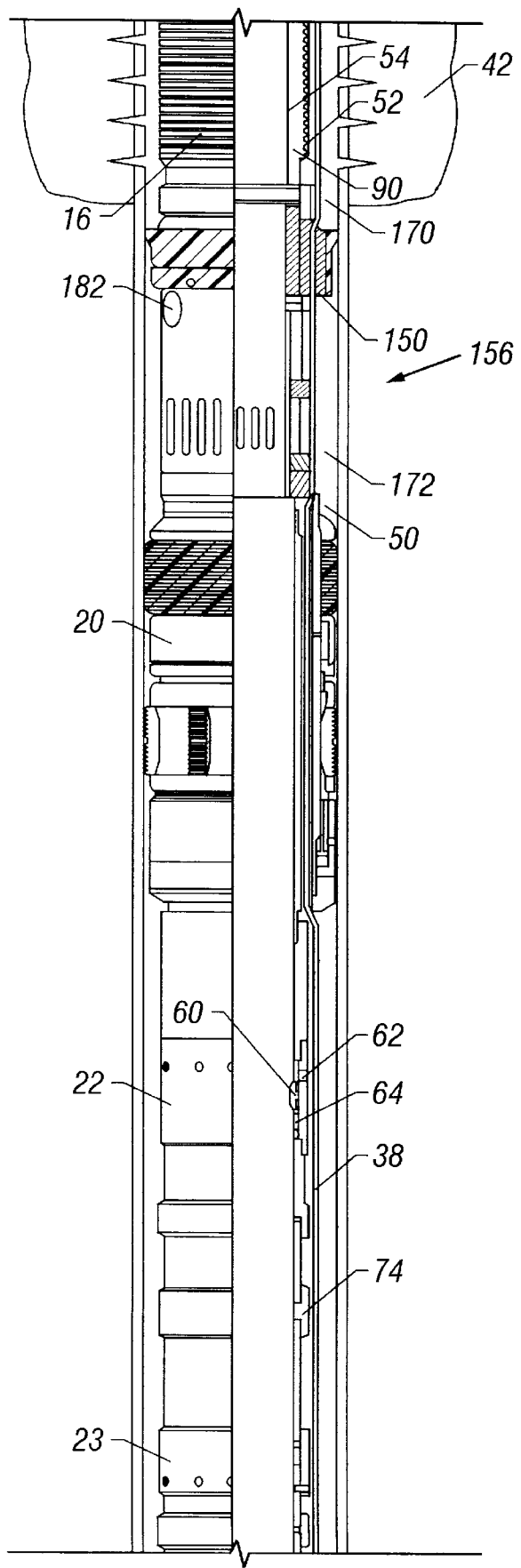
Figure 3C:
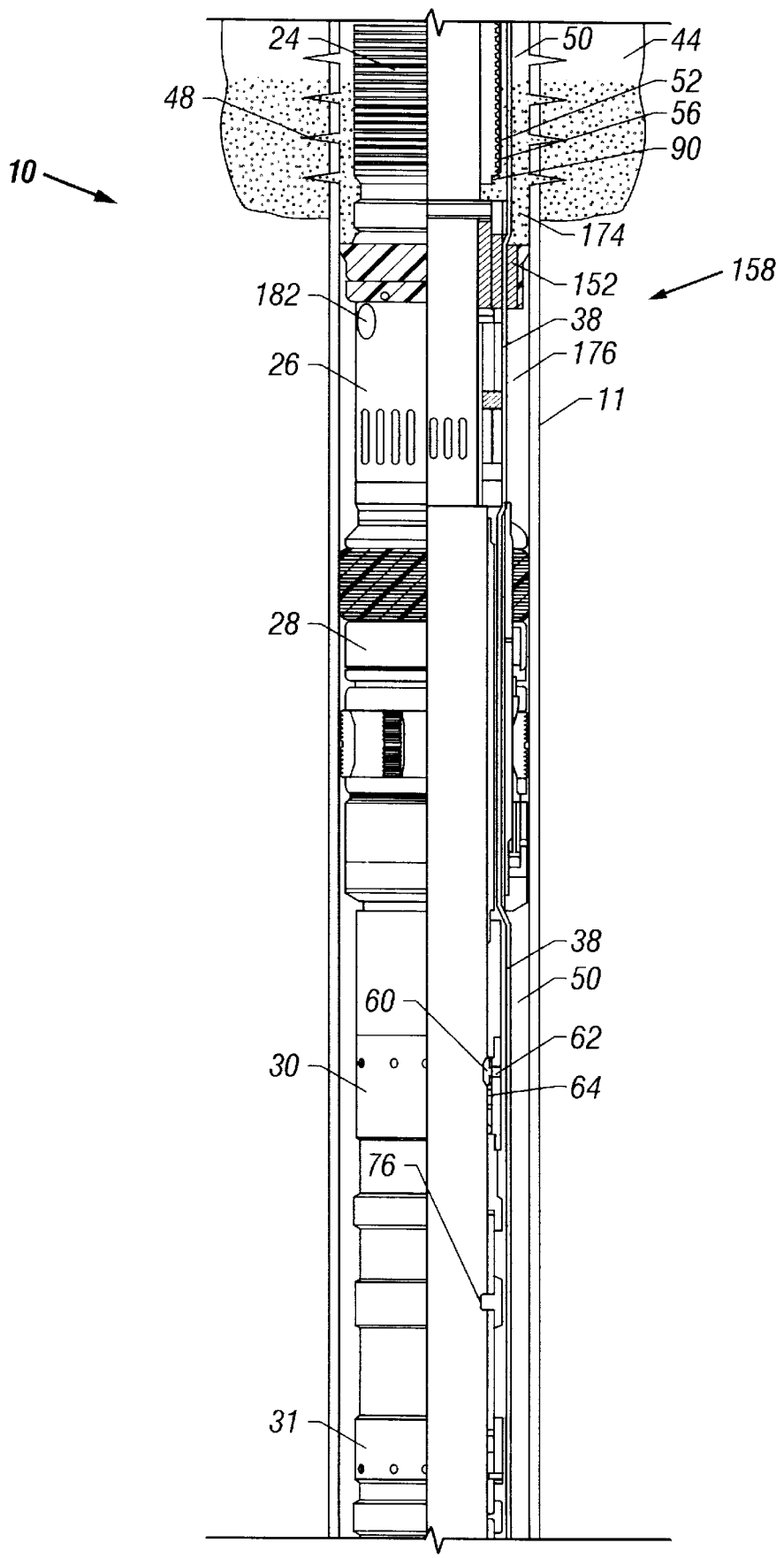
Figure 3D:
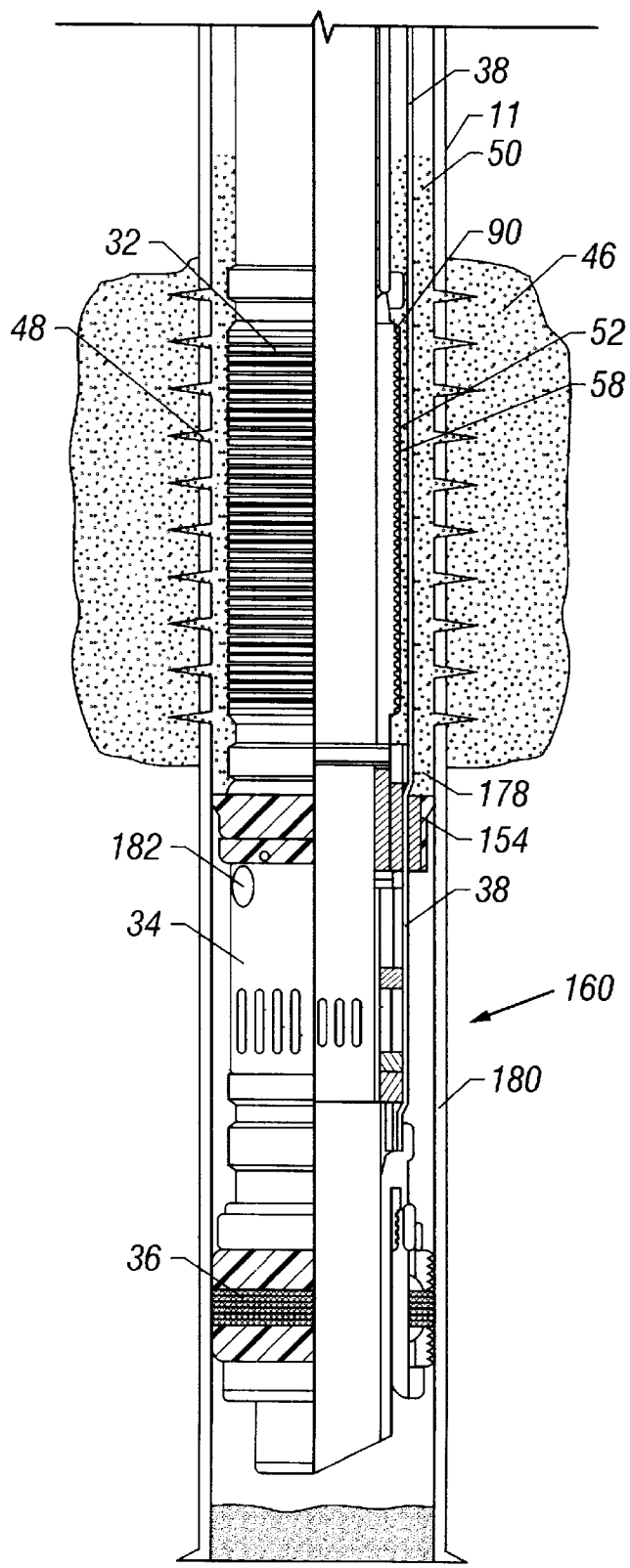

FIGS. 2A–2C illustrate an enlarged view of the components of the completion 10 shown in FIGS. 1B and 1C that are used to gravel pack the second production zone 44. FIGS. 2A–2C also illustrate a service tool 66. As shown at the top of FIG. 2A, the service tool 66 is attached to a thru-tubing service string 67 (e.g., jointed tubing, coiled tubing, etc.) which are together deployed through the production tubing 40 and into the completion 10. The service tool 66 may be similar in structure and operation to service tools of the type that have been traditionally used in deploying sand-control completions, and may include a standard crossover housing 68 and a ball valve 70, except that the service tool 66 is run through the tubing 40 and is not provided with the structure used in previously existing service tools to attach to and set a packer. While the service tool 66 is shown with a ball valve 70, that should not be taken as a limitation; the present invention is intended to cover service tools 66 that lack a ball valve 70. For example, the service tool 66 may be of the type that is manipulated by movement of the service tool 66 relative to one or more of the packers 12, 20, or 28.

The completion 10 may also include: a first inner shoulder 72 between the first packer 12 and the first sand screen 16 (see FIG. 1A); a second inner shoulder 74 between the second packer 20 and the second sand screen 24 (see FIG. 1B); and a third inner shoulder 76 between the third packer 28 and the third sand screen 32 (see top of FIG. 1D). Movement of the ball valve 70 relative to any of the shoulders 72–76 will open and close the ball valve 70. As shown in FIG. 2B, the service tool 66 may be provided with a shifting and latching member 78 for mating with or engaging: each of the closure members 60 on the closing sleeves 14, 22 and 30; and each of the shoulders 72–76. In an embodiment, the shifting and latching member 78 may be a collet. As the service tool 66 is run through the completion 10, the member 78 is used to shift the closure members 60 between their open and closed positions, to thereby selectively permit and restrict fluid flow through the flow ports 62 of the closing sleeves 14, 22 and 30. It is noted that the closing sleeves 14, 22 and 30 may also be shifted between their open and closed positions by any known intervention tool. The member 78 may also function to releasably engage the service tool 66 with the completion 10 by engagement with any of the shoulders 72–76.

Before explaining in detail how the service tool 66 is used within the completion 10, one particular manner in which the latching/shifting member 78 may be used to open and close the closure members 60 will first be explained. In an embodiment, as the service tool 66 is lowered through the well completion 10 the latching/shifting member 78 will contact each closure member 60 and step, or increment, the opening mechanism 64 (e.g., a ratchet mechanism) associated with each closure member 60. These initial downpasses will not, however, shift the closure members 60 to their open positions. After the member 78 passes the closure member 60 on the third closing sleeve 30, the service tool 66 is raised up above the third closure member 60 and then lowered back down over the third closure member 60. This second downpass of the member 78 across the third, or lowermost, closure member 60 will shift the lowermost closure member 60 to its open position. Once the lowermost, or third, production zone 46 has been treated (as more fully explained below), the service tool 66 is raised up again. The member 78 will pass across and close the lowermost closure member 60 as it moves upwardly. The service tool 66 will continue upwardly to treat the second production zone 44, and then the first production zone 42, in the same manner as discussed above with regard to the third closing sleeve 30.

In another embodiment, the latching/shifting member 78 is lowered in a collapsed state so that as the service tool 66 is run through the completion 10, the latching/shifting member 78 does not engage the closure member 60 of each closing sleeve. Once the latching/shifting member 78 according to this alternative embodiment is lowered below the lowermost closure member 60, the latching/shifting member 78 can be deployed by some activation stimulus, e.g., increased pressure, applied mechanical force, electrical signaling, etc.

The service tool 66 is used in connection with the completion 10 to independently gravel pack or circulate fluids through each of the production zones 42–46. For illustration purposes only, the manner in which the service tool 66 operates will be explained in relation to the second production zone 44, and with reference to FIGS. 2A–2C. For purposes of the following discussion, it is assumed that the third, or lower, production zone 46 has already been treated in the manner about to be described. When the second production zone 44 is being treated, the first closing sleeve 14 and the first surface controlled flow control device 18 are closed, as are the third closing sleeve 30 and the third surface controlled flow control device 34. The shifting/latching member 78 on the service tool 66 (FIG. 2B) is used to shift the closure member 60 on the second closing sleeve 22 (FIG. 2A) to its open position, thereby permitting fluid flow through the flow ports 62 in the second closing sleeve 22.

The service tool 66 is then moved downwardly so as to bring the shifting/latching member 78 into engaged relationship with the second shoulder 74, as shown at the top of FIG. 2B.

Once the service tool 66 has been so positioned, a gravel pack slurry, represented by arrows 80 in FIG. 2A, is pumped downwardly within the service string 67 and is directed through a radial port 82 in the crossover housing 68 and through the open flow ports 62 in the second closing sleeve 22 into the annulus 50 below the second packer 20. It is noted that the service tool 66 may include one or more annular seals 84 to prevent downward fluid flow into the space between the service tool 66 and the completion 10. The fluid continues down the annulus 50 and, as shown in FIGS. 2B and 2C, may be "squeezed" into the second formation 44 through the perforations 48, as indicated, for example, by arrow 86. The ball valve 70 or the second surface controlled flow control device 26 are closed during this "squeeze" operation. It is noted that, since the second surface controlled flow control device 26 can restrict fluid flow by itself, it is not necessary for the service tool 66 to be provided with the ball valve 70 in order to perform a "squeezing" operation. It is further noted that the third packer 28 (FIG. 1C) prevents the slurry from migrating downwardly in the casing 11 to the third production zone 46.

Next, when it is desired to circulate the slurry to the earth's surface (not shown), the service tool 66 is stroked relative to the second shoulder 74 to open the ball valve 70, and a signal is sent via the control conduit 38 to open the second surface controlled flow control device 26. Fluid flow is then directed down the service string 67 and into the annulus 50 below the second packer 20 in the same manner as discussed above. But instead of squeezing the fluid into the second formation 44, slurry represented by arrows 88 (FIGS. 2B and 2C) flows through the passageways 52 in the second sand screen 24, into an annular passageway 90 formed between the sand screen 24 and the internal sleeve member 56 (also referred to as being "inside" the sand screen 24) through a flowpath 92 communicating with the annular passageway 90 and flow ports 94 in the second surface controlled flow control device 26, through the open flow ports 94, and into a longitudinal bore 96 of the completion 10. The slurry continues to circulate upwardly into a longitudinal bore 98 of the service tool 66, as represented by arrow 100 in FIG. 2B. The slurry continues past the now-open ball valve 70 and into a longitudinal passageway 102 in the crossover housing 68 of the service tool 66, as represented by arrows 104 in FIG. 2A. With reference to the top of FIG. 2A, slurry flow continues upwardly through the longitudinal passageway 102, out through a discharge port 106 in the crossover housing 68, and upwardly to the earth's surface through an inner annulus 108 formed between the service string 67 and the completion 10 or the production tubing 40.

Upon completion of pumping operations with regard to the second production zone 44, a signal will be sent via the control conduit 38 to the second surface controlled flow control device 26 to close its flow ports 94, and the service tool 66 will be lifted upwardly to treat the first production zone 42. As the service tool 66 is being lifted upwardly, the shifting/latching member 78 (FIG. 2B) will engage and shift the closure member 60 on the second closing sleeve 22 to its closed position so as to restrict fluid flow through the flow ports 62 in the second closing sleeve 22. By closing the second surface controlled flow control device 26 and the second closing sleeve 22, the second production zone 44 is isolated from the first and third production zones 42 and 46. The first production zone 42 is treated in the same manner as described above with regard to the second production zone 44.

The service tool 66 will be moved to each subsequent production zone to perform the necessary pumping operations until all zones have been treated. The service tool 66 will then be removed from the casing 11. Production of hydrocarbons may then commence by sending a signal to open one or more of the surface controlled flow control devices 18, 26 or 34.

FIGS. 3A–3D illustrate a different embodiment of the completion 10 shown in FIGS. 1A–1D. Similar to the relation between FIGS. 2A–2C and FIGS. 1A–1D, FIGS. 4A–4C illustrate the more detailed view of one set of elements (those adjacent to the second production zone 44) of the completion 10 shown in FIGS. 3A–3D. With respect to all of the figures, like reference numbers correspond to like elements.

The main differences between the embodiment illustrated in FIGS. 1A–1D and the embodiment illustrated in FIGS. 3A–3D are that the embodiment of FIGS. 3A–3D includes an additional first sealing element 150, second sealing element 152, and third sealing element 154 as well as a different type of first, second, and third flow control devices 156, 158, and 160. In addition, unlike the embodiment of FIGS. 1A–1D, the embodiment illustrated in FIGS. 3A–3D does not include first, second, or third lower safety shear subs 19, 27, and 31. However, their inclusion in the completion 10 is optional to the user. In the embodiment shown in FIGS. 3A–3D, a first sealing element 150 is disposed intermediate the first sand screen 16 and the first flow control device 156, a second sealing element 152 is disposed intermediate the second sand screen 24 and the second flow control device 158, and a third sealing element 154 is disposed intermediate the third sand screen 32 and the third flow control device 160.

First, second, and third sealing elements 150, 152, 154 may comprise packers, such as compression or cup packers, that may be of the "multiport" type (i.e., one that allows for passage of a plurality of control lines therethrough), also known as a "control line bypass" packer, and be capable of sealably passing the control conduit 38 therethrough while at the same time maintaining pressure integrity and sealing against casing 11. For those embodiments in which sealing elements 150, 152, and 154 include settable elements (i.e., non-cup packers), first, second, and third sealing elements 150, 152, 154 may be set at the same time as packers 12, 20, 28 and 36 in any manner known in the art (e.g., pressuring up the production tubing 40, via the control line 38, or with a service tool). First sealing element 150 divides the annulus 50 between first packer 12 and second packer 20 into a first upper annular region 170 and a first lower annular region 172. Second sealing element 152 divides the annulus 50 between second packer 20 and third packer 28 into a second upper annular region 174 and a second lower annular region 176. Third sealing element 154 divides the annulus 50 between third packer 28 and fourth packer 36 into a third upper annular region 178 and a third lower annular region 180.

A bypass flowpath 182 that provides fluid communication between the annular passageway 90 of each of the first, second, and third sand screens 16, 24, and 32 and its respective lower annular regions 172, 176, and 180, is defined in completion 10. Preferably, a bypass flowpath 182 is defined by each of the first, second, and third sealing elements 150, 152, 154. The first, second, and third lower annular regions 172, 176, and 180 are, in turn, in fluid communication with the flow ports 94 (when open) of the first, second, and third fluid control devices 156, 158, and 160, respectively.

Figure 4C:
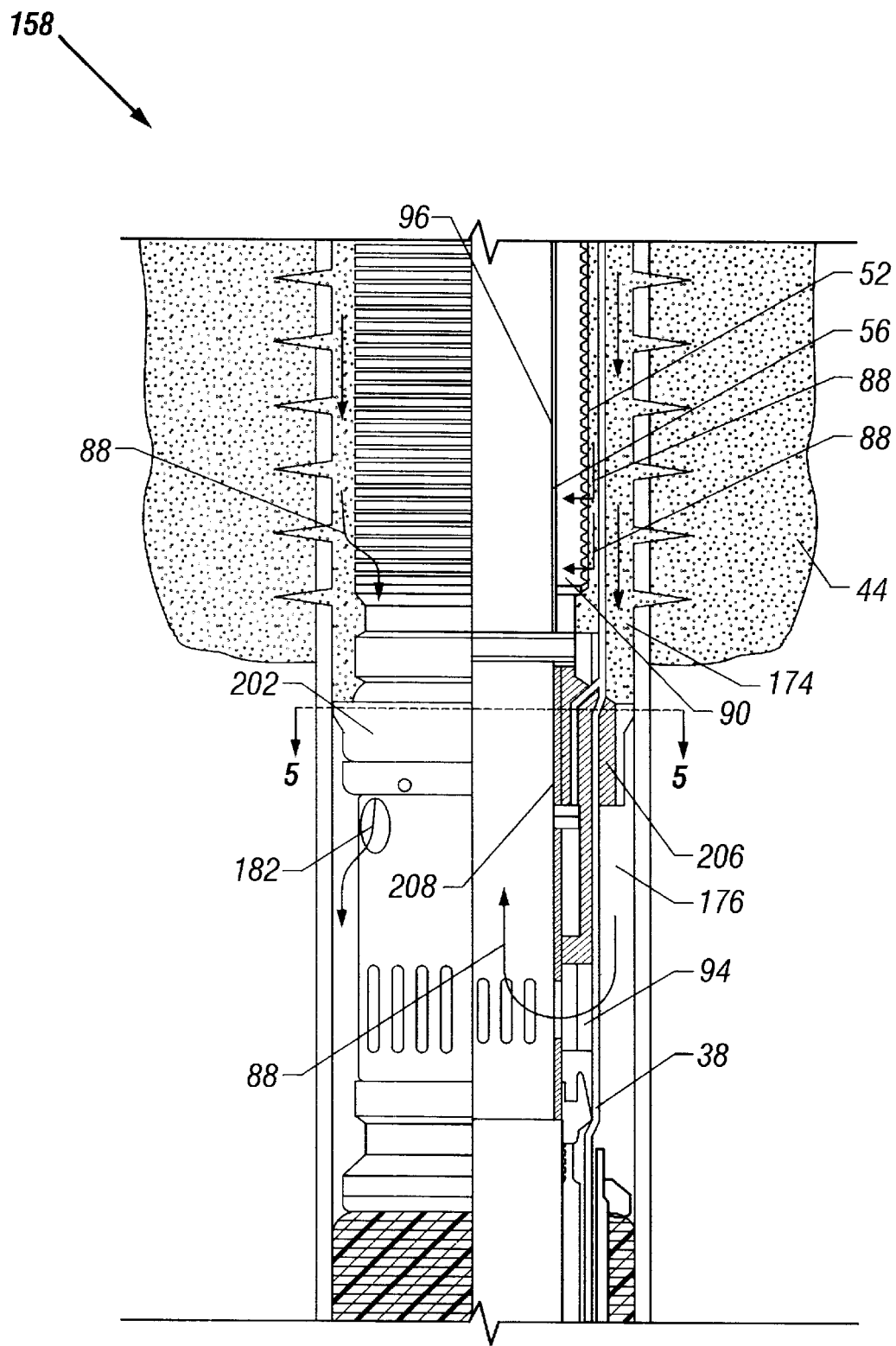
Figure 5:
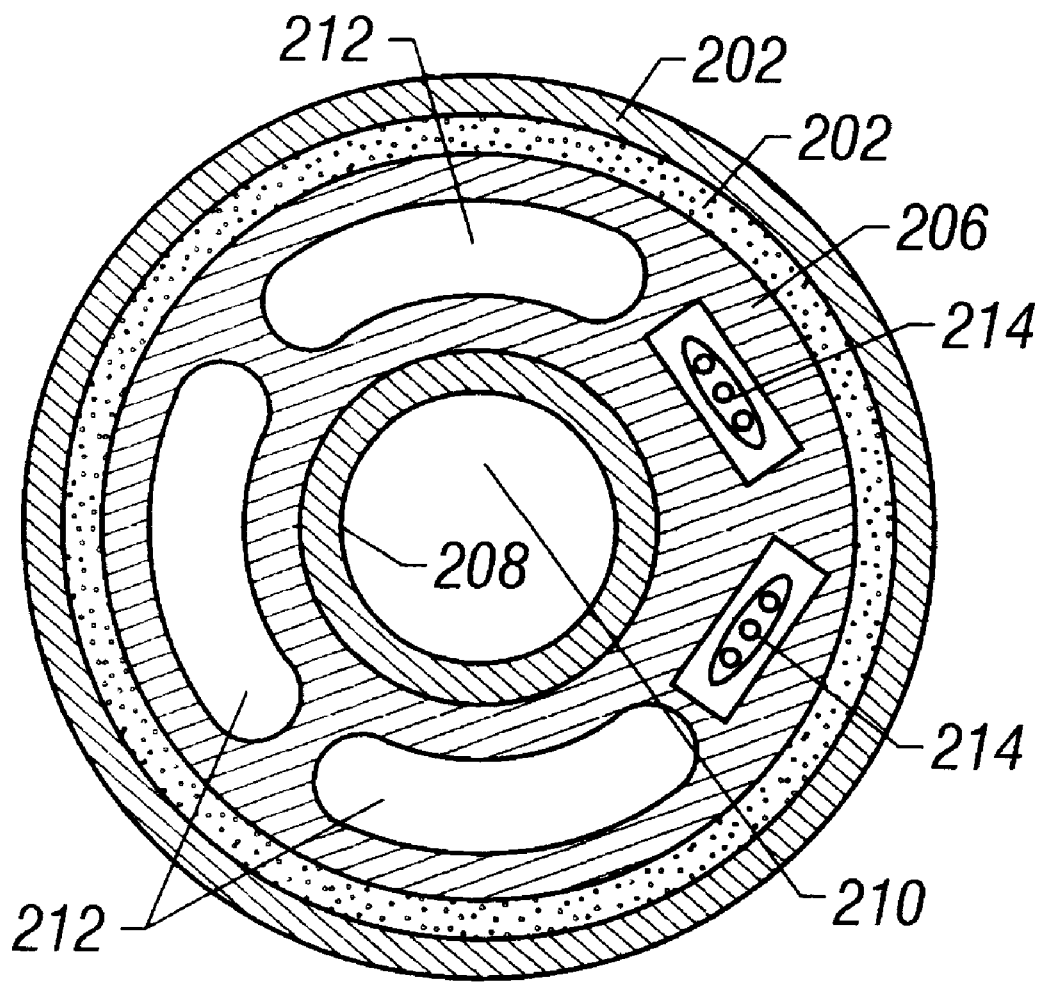
FIG. 5 is a cross-sectional view of a sealing element in the embodiment of FIGS. 3A–3D.

FIG. 5 shows a cross-sectional view of the sealing element 150, 152, or 154. A outer layer 202 formed of an elastomer or other compressible material is engageable against the inner wall of the casing 11 to form a seal. The outer layer 202 is carried on a mandrel 206 through which longitudinal channels 214 can be formed for communication with respective channels of the control conduit 38. In addition, bypass conduits 212 are longitudinally formed through the sealing element 150, 152, or 154. The bypass conduits 212 are in communication with the bypass flowpath 182 shown in FIG. 4C. The bypass conduits 212 connect the annular passageway 90 to the bypass flowpath 182. In another embodiment, instead of plural bypass conduits 212, a single bypass conduit 212 may be employed. An inner sleeve 208 of the sealing element 150, 152, 154 defines a longitudinal bore 210 through which fluids may flow.

The gravel pack operation of the embodiment of FIGS. 3A–3D/4A–4C is generally the same as the gravel pack operation of the embodiment of FIGS. 1A–1D/2A–2C until it is desired to circulate slurry to the earth's surface. It is noted, however, that the presence of the first, second, and third sealing elements, 150, 152, 154, (when set) prohibits the passage of gravel pack from each of the upper annular regions, 170, 174, 178, to its respective lower annular region, 172, 176, 180. In the embodiment of FIGS. 3A–3D/4A–4C, when it is desired to circulate the slurry to the earth's surface (not shown), the service tool 66 is stroked relative to the second shoulder 74 to open the ball valve 70, and a signal is sent via the control conduit 38 to open the second flow control device 158. Fluid flow is then directed down the service string 67 and into the second upper annular region 174 below the second packer 20. But instead of squeezing the fluid into the second formation 44, slurry represented by arrows 88 (FIGS. 4B and 4C) flows through the passageways 52 in the second sand screen 24, into an annular passageway 90 formed between the sand screen 24 and the internal sleeve member 56, through the bypass flowpath 182, into the second lower annular region 176, through the open flow ports 94, and into longitudinal bore 96 of the completion 10. The slurry continues to circulate upwardly into a longitudinal bore 98 of the service tool 66, as represented by arrow 100 in FIG. 4B. The slurry continues past the now-open ball valve 70 and into a longitudinal passageway 102 in the crossover housing 68 of the service tool 66, as represented by arrows 104 in FIG. 4A. With reference to the top of FIG. 4A, slurry flow continues upwardly through the longitudinal passageway 102, out through the discharge port 106 in the crossover housing 68, and upwardly to the earth's surface through an inner annulus 108 formed between the service string 67 and the completion 10 or the production tubing 40. Upon completion of pumping operations with regard to the second production zone 44, a signal will be sent via the control conduit 38 to the second flow control device 158 to close its flow ports 94, and the service tool 66 will be lifted upwardly to treat the first production zone 42. The remainder of the operation of the embodiment of FIGS. 3A–3D/4A–4C is the same as that of the embodiment of FIGS. 1A–1D/2A–2C.

The majority of prior art flow control devices direct flow to and from the annulus and inner bore of a tubing string. The embodiment of completion 10 illustrated in FIGS. 3A–3D/4A–4C enables the use of such prior art flow control devices primarily by including the first, second, and third sealing elements, 150, 152, 154, and the bypass flowpath 182, which provides fluid communication between the annular passageway 90 of each of the first, second, and third sand screens 16, 24, and 32 and the first, second, and third lower annular regions 172, 176, and 180, respectively. On the other hand, in the embodiment of completion 10 illustrated in FIGS. 1A–1D/2A–2C, a flowpath 92 directly communicates the annular passageway 90 of each of the first, second, and third sand screens, 16, 24, 32, with the flow ports of each of the flow control devices, 18, 26, 34, without first passing the flow through any part of the annulus 50. Thus, since the flow does not pass from the annulus to the inner bore in the embodiment of FIGS. 1A–1D/2A–2C, the prior art flow control devices could not be used with the embodiment of completion 10 illustrated in FIGS. 1A–1D/2A–2C, without first changing the design of such flow control devices.

Figure 4A:
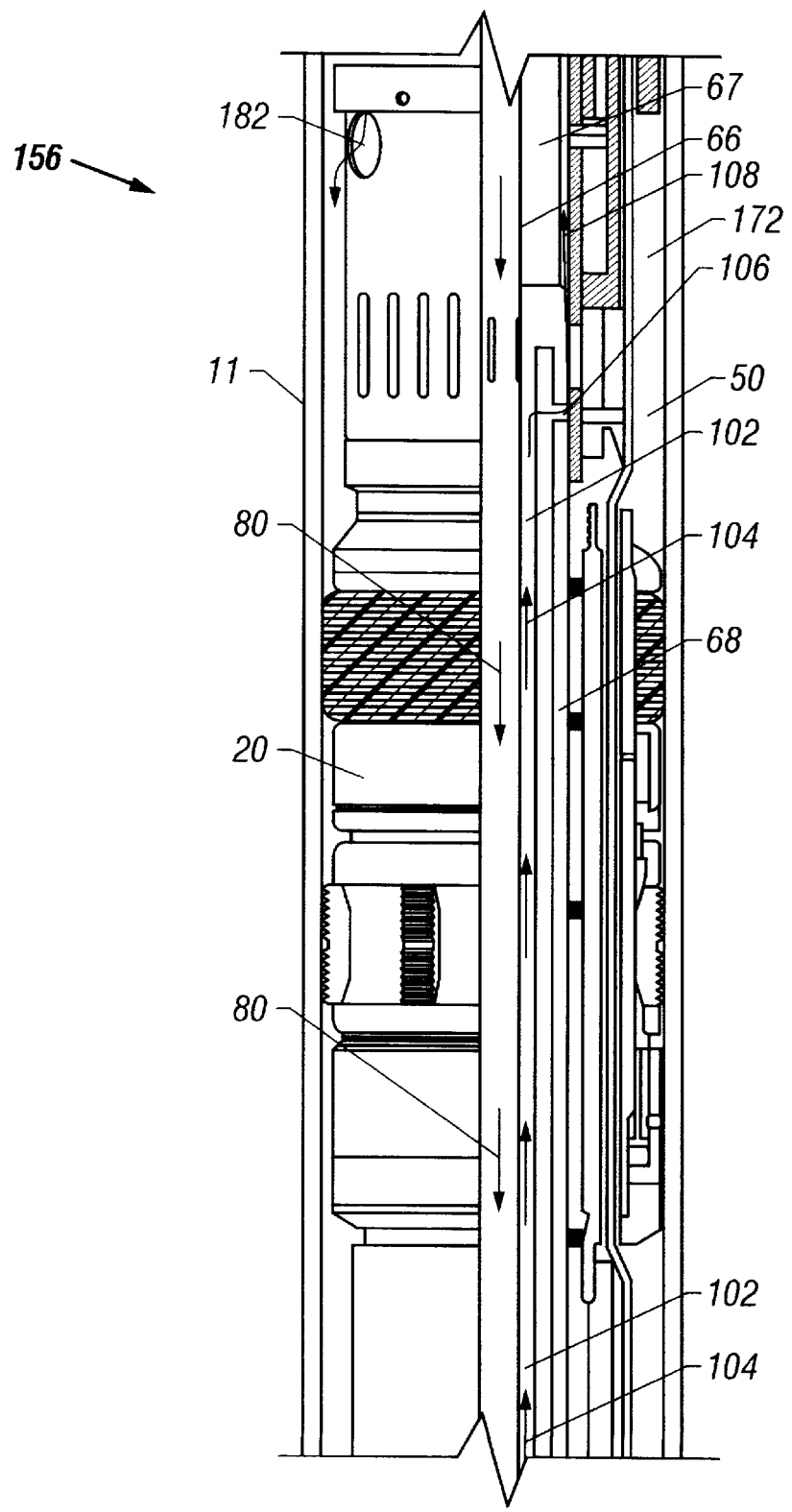
FIGS. 4A–4C illustrate an enlarged longitudinal view in partial cross-section of a portion of the well completion shown in FIGS. 3A–3D.
Figure 4B:
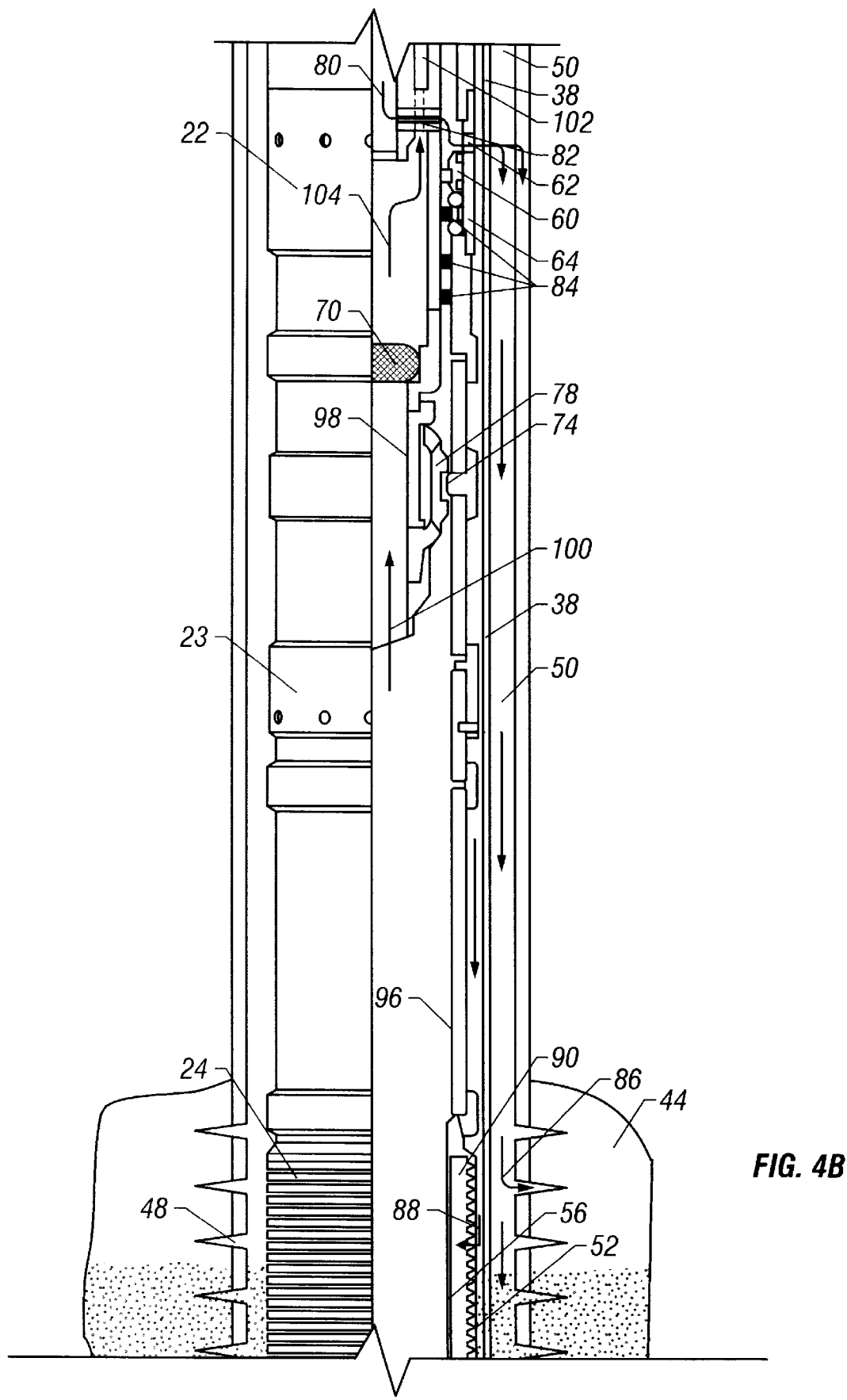

To produce hydrocarbons using the device of FIGS. 4A–4C, the service tool 66 is first removed. Since the production tubing 40 is in place, appropriate downhole and surface valves may be actuated and pumps (if any) may be activated to start the production. The hydrocarbons flow from the formation 44 through the perforations, gravel pack, and sand screen into the annular passageway 90. The hydrocarbons flow down the annular passageway through the one or more bypass conduits 212 to corresponding one or more bypass flowpaths 182. The hydrocarbons then flow through the annular region 176 and through the flow control device 158 to the longitudinal bore 96 of the completion 10.

In light of the above description, it should now be readily apparent that the present invention positively addresses the need for a multiple-zone sand control completion system, and does so without the spacing drawback suffered by other systems. As noted above, other systems require a minimum spacing distance between adjacent production zones or sand screens, since they rely upon external annular seals of a service tool to isolate production zones from each other. With the present invention, however, the production zones are isolated internally from each other by the flow control devices and closure members. As such, the present invention provides a multiple-zone sand control completion system that avoids the spacing drawback suffered by other systems. In addition, this flexibility in spacing allows for the insertion, if desired, of additional tubing string in between any of the completion components.

It is to be understood that the invention is not limited to the exact details of construction, operation, exact materials or embodiments shown and described, as obvious modifications and equivalents will be apparent to one skilled in the art. For example, the various embodiments of the completion 10 of the present invention are shown disposed within a vertical, cased well bore. This should not be taken as a limitation. Instead, the invention is equally application to open hole and/or horizontal well bores. Also, in addition to using the present invention for gravel packing purposes, it may also be used for many other purposes, such as for cleaning, stimulating and fracturing, to name a few. Further, while the present invention has been explained in relation to three production zones, that should not be taken as a limitation. Instead, the present invention may be used to treat any number of formations. Accordingly, the invention is therefore to be limited only by the scope of the appended claims.

What is claimed is:

1. A string, comprising:
   a tubing;
   a sealing element coupled to the tubing;
   a sand control device positioned below the sealing element;
   a tool adapted to be run through the tubing to perform at least one of a gravel pack operation, a fracturing operation, a cleaning operation, and a stimulating operation; and
   a flow control device controllable by a signal that is one of a signal communicated through a control conduit and a wireless signal, the flow control device adapted to control fluid flow from an annulus region outside the sand control device to the tubing.

2. The string of claim 1, wherein the flow control device is actuatable at least between an open position and a closed position.

3. The string of claim 2, wherein the sand control device and the flow control device cooperate to enable a gravel pack squeeze operation in a first state and a circulate operation in a second state.

4. The string of claim 3, wherein the sand control device comprises a sand screen and an annular passageway inside the sand screen, the annular passageway in communication with the flow control device.

5. The string of claim 4, further comprising a longitudinal bore, wherein the flow control device is adapted to be opened to enable circulation of fluid through the annular passageway and the flow control device into the longitudinal bore of the string.

6. The string of claim 5, further comprising a valve actuatable between an open position and a closed position to control fluid flow in the longitudinal bore of the string.

7. The string of claim 1, further comprising a closure member adapted to be actuated to an open position to enable fluid flow to the annular region outside the sand control device.

8. The string of claim 7, wherein the flow control device is adapted to be closed to perform a squeeze operation.

9. The string of claim 8, wherein the flow control device is adapted to be opened to perform a circulate operation.

10. A string, comprising:
    a tubing;
    a sealing element coupled to the tubing;
    a sand control device positioned below the sealing element;
    a tool adapted to be run through the tubing to perform at least one of a gravel pack operation, a fracturing operation, a cleaning operation, and a stimulating operation; and
    an intelligent completions device positioned below the sand control device and a control conduit extending past the sand control device to the intelligent completions device.

11. A string, comprising:
    a tubing;
    a sealing element coupled to the tubing;
    a sand control device positioned below the sealing element;
    a tool adapted to be run through the tubing to perform at least one of a gravel pack operation, a fracturing operation, a cleaning operation, and a stimulating operation;
    a flow control device actuatable at least between an open position and a closed position; and
    a control conduit adapted to carry a signal to operate the flow control device.

12. A string, comprising:
    a tubing;
    a sealing element coupled to the tubing;
    a sand control device positioned below the sealing element; and a fluid communication control device to control flow of fluid between the tubing and a region outside the sand control device;

a tool adapted to be run through the tubing and to actuate the fluid communication control device; and a flow control device controllable by a signal that is at least one of a signal communicated through a control conduit and a wireless signal, the flow control device adapted to control fluid flow from the region outside the sand control device to the tubing.

13. The string of claim 12 wherein the tool comprises a service tool adapted to perform at least one of a gravel pack operation, a fracturing operation, a cleaning operation, and a stimulating operation.

14. The string of claim 12, wherein the sealing element comprises a packer.

15. The string of claim 12, wherein the tubing comprises a production tubing.

16. The string of claim 12, wherein the fluid communication control device comprises a closing sleeve.

17. The string of claim 16, wherein the tool is adapted to open the closing sleeve to perform a gravel pack operation.

18. The string of claim 12, wherein the flow control device is actuatable at least between an open position and a closed position.

19. The string of claim 18, wherein the fluid communication control device and the flow control device cooperate to enable a gravel pack squeeze operation in a first state and a circulate operation in a second state.

20. The string of claim 19, wherein the sand control device comprises a sand screen and an annular passageway inside the sand screen, the annular passageway in communication with the flow control device.

21. The string of claim 20, further comprising a longitudinal bore, wherein the flow control device is adapted to be opened to enable circulation of fluid through the annular passageway and the flow control device into the longitudinal bore of the string.

22. The string of claim 21, further comprising a valve actuatable between an open position and a closed position to control fluid flow in the longitudinal bore of the string.

23. The string of claim 18, wherein the flow control device is operated by a wireless mechanism.

24. The string of claim 12, further comprising at least another sealing element, at least another sand control device, and at least another fluid communication control device, wherein the tool is adapted to be run to another position in the string and to actuate the at least another fluid communication control device.

25. A string, comprising:
a tubing;
a sealing element coupled to the tubing;
a sand control device positioned below the sealing element;
a fluid communication control device to control flow of fluid between the tubing and a region outside the sand control device;
a tool adapted to be run through the tubing and to actuate the fluid communication control device;
a flow control device actuatable at least between an open position and a closed position; and
a control conduit adapted to carry a signal to operate the flow control device.

26. An apparatus for use in a well, comprising:
a production tubing;
a sand control assembly coupled to the production tubing;
an intelligent completions device, the sand control assembly, the intelligent completions device, and the production tubing adapted to be lowered as a string in a single run; and
a control conduit extending along the production tubing and to the intelligent completions device, the control conduit adapted to communicate a signal to operate the intelligent completions device.

27. The apparatus of claims 26, wherein the intelligent completions device is positioned below the sand control assembly.

28. The apparatus of claim 26, wherein the control conduit comprises at least one of an electrical conduit, a fiber optic conduit, and a hydraulic conduit.

29. The apparatus of claim 26, further comprising at least one other sand control assembly comprising an intelligent completions device, the control conduit extending to the intelligent completions device of the at least one other sand control assembly.

30. An apparatus for use in a wellbore, comprising:
a sand control assembly having a screen and defining an annular passageway inside the screen;
a sealing element; and
a flow control device having one or more radial flow ports to receive fluid from an annular region outside the flow control device,
the sealing element being positioned between the sand control assembly and the flow control device,
the sealing element having one or more bypass conduits to enable fluid communication between the annular passageway and the annular region outside the flow control device.

31. The apparatus of claim 30, wherein the sealing element comprises a packer.

32. The apparatus of claim 30, wherein the sealing element is adapted to prevent passage of gravel pack material from an annular region outside the screen to the annular region outside the flow control device.

33. A method of gravel packing a wellbore, comprising:
positioning a string having a tubing and sand control assembly;
running a service tool through the tubing;
using the service tool to perform at least one of a gravel packing operation, a fracturing operation, a stimulating operation, and a cleaning operation; and
remotely operating a flow control device to control flow from an annular region outside the sand control assembly using a signal that is one of a signal communicated through a control conduit and a wireless signal.

34. The method of claims 33, further comprising opening a fluid communication control device using the service tool and flowing a gravel pack slurry through the fluid communication control device to gravel pack the annular region outside the sand control assembly.

35. The method of claim 34, wherein the service tool is coupled to a conduit that passes through at least a portion of the tubing, and wherein flowing the gravel pack slurry comprises flowing the gravel pack slurry through the conduit.

36. The method of claim 34, further comprising maintaining the flow control device closed while gravel packing to enable a squeeze operation.

37. The method of claim 36, further comprising opening the flow control device to enable circulation of gravel pack fluid.

38. The method of claim 37, further comprising closing the flow control device to perform a squeeze operation.

39. The method of claim 34, wherein the string further comprises at least one other sand control assembly and at least one other fluid communication control device, the method further comprising running the service tool proximal the at least one other fluid communication control device to actuate the fluid communication control device.

40. The method of claim 33, wherein the wellbore extends through plural zones, the method further comprising running the service tool to the plural zones.

41. A method of performing sand control in a wellbore, comprising:
running, in a single run, a string comprising a production tubing, a sand control assembly, an intelligent completions device positioned below the sand control assembly, and a control conduit extending along the production tubing to the intelligent completions device.

42. The method of claims 41, further comprising transmitting a signal through the control conduit to activate the intelligent completions device.

43. A method for use in a well, comprising:
providing an apparatus having a sand control assembly having a screen and defining an annular passageway inside the screen;
providing a sealing element;
providing a flow control device to receive fluid from an annular region outside the flow control device; and
routing fluid flow from the annular passageway through a bypass flow conduit in the sealing element to the annular region on the other side of the sealing element.

44. The method of claim 43, further comprising:
gravel packing in an annular region outside the screen; and
preventing passage of gravel pack material from the annular region outside the screen to the annular region outside the flow control device.

45. A well completion disposed within a casing, comprising:
a production tubing;
a first packer coupled to the production tubing;
a first closing sleeve disposed below the first packer;
a first sand screen disposed below the first closing sleeve and having a plurality of fluid passageways disposed therethrough;
a first internal sleeve member disposed within the first sand screen, the first sand screen and first internal sleeve defining an annular passageway therebetween, the annular passageway being in fluid communication through the fluid passageways in the sand screen with a well annulus formed between the completion and the casing; and
a first surface controlled flow control device having at least one remotely openable and closable flow port in fluid communication with the annular passageway, whereby fluid communication between the annular passageway and a longitudinal bore of the completion is established through the at least one flow port when the at least one port is in an open position and restricted when the at least one port is in a closed position,
the first surface controlled flow control device actuatable by a signal that is one of a signal communicated through a control conduit and a wireless signal.

46. The well completion of claim 45, further comprising a first safety shear sub disposed between the first closing sleeve and the first sand screen.

47. The well completion of claim 46, further comprising a second packer disposed below the first surface controlled flow control device.

48. The well completion of claim 47, further comprising a second safety shear sub disposed between the first surface controlled flow control device and the second packer.

49. The well completion of claim 45, wherein the first closing sleeve includes at least one flow port and a remotely shiftable closure member adapted to permit and restrict fluid flow through the at least one flow port.

50. The well completion of claim 49, further comprising a service tool adapted for releasable engagement with the closure member to open and close the at least one flow port in the first closing sleeve.

51. The well completion of claim 45, further comprising:
a second packer disposed below the first surface controlled flow control device;
a second closing sleeve disposed below the second packer;
a second sand screen disposed below the second closing sleeve and having a plurality of fluid passageways disposed therethrough;
a second internal sleeve member disposed within the second sand screen, the second sand screen and second internal sleeve defining an annular passageway therebetween, the annular passageway being in fluid communication through the fluid passageways in the sand screen with the well annulus; and
a second surface controlled flow control device connected to the control conduit and having at least one remotely openable and closable flow port in fluid communication with the annular passageway, whereby fluid communication between the annular passageway and the longitudinal bore of the completion is established through the at least one flow port when the at least one port is in an open position and restricted when the at least one port is in a closed position,
the second surface controlled flow device actuatable by a signal that is one of a signal communicated through a control conduit and a wireless signal.

52. The well completion of claim 45, further comprising a service tool adapted for being deployed through the production tubing to perform sand control pumping operations in the completion.

53. The well completion of claim 45, further comprising a control conduit extending from the earth's surface and connected to the first surface controlled flow control device.

54. A method of completing a well having a plurality of production zones, comprising:
remotely restricting fluid communication between all but one of the plurality of production zones and a longitudinal bore of a well completion;
using a first flow control device and a closure member to remotely establish fluid communication between the one of the plurality of production zones and the longitudinal bore; and
remotely controlling the first flow control device using a signal transmitted via a control conduit connected to the first flow control device.

55. The method of claim 54, further comprising circulating fluid to the one of the plurality of production zones.

56. The method of claim 55, wherein the fluid is a gravel pack slurry.

57. The method of claim 55, further comprising using a service tool to shift the closure member to permit fluid circulation into a well annulus.

58. The method of claim 54, wherein each of the plurality of production zones is selectively isolated by at least one of a closure member and a flow control device.

* * * * *